United States Patent [19]
Porter

[11] Patent Number: 4,821,422
[45] Date of Patent: Apr. 18, 1989

[54] MAGNETIC WIRE HOLDING DEVICE

[75] Inventor: Robert D. Porter, Florissant, Mo.

[73] Assignee: McDonnell Douglas Corporation, Long Beach, Calif.

[21] Appl. No.: 146,606

[22] Filed: Jan. 11, 1988

[51] Int. Cl.[4] .............................................. G01B 5/16
[52] U.S. Cl. ............................. 33/199 R; 33/DIG. 1; 33/558
[58] Field of Search ............ 33/147 F, 147 M, 199 R, 33/DIG. 1, 167, 199 B, 558

[56] References Cited

U.S. PATENT DOCUMENTS

| | | | |
|---|---|---|---|
| 1,392,313 | 10/1921 | Fallow | 33/167 |
| 2,561,534 | 7/1951 | Parker et al. | 33/147 M |
| 2,831,260 | 4/1958 | Shaw | 33/167 X |
| 2,906,029 | 9/1959 | Croshier et al. | 33/147 M |
| 2,939,220 | 6/1960 | Croshier et al. | 33/199 R X |

Primary Examiner—William D. Martin, Jr.
Attorney, Agent, or Firm—Randall M. Heald; George W. Finch; John P. Scholl

[57] ABSTRACT

An improved measuring device for determining both major and pitch diameters of screw threads, gears, splines and the like, wherein attractable magnetic members attached to a movable spindle and fixed anvil serve to attract and retain gauging wires in their proper positions. An adjustable screw and spring assembly biases the spindle toward the anvil with a predetermined and readily adjustable pressure.

20 Claims, 2 Drawing Sheets

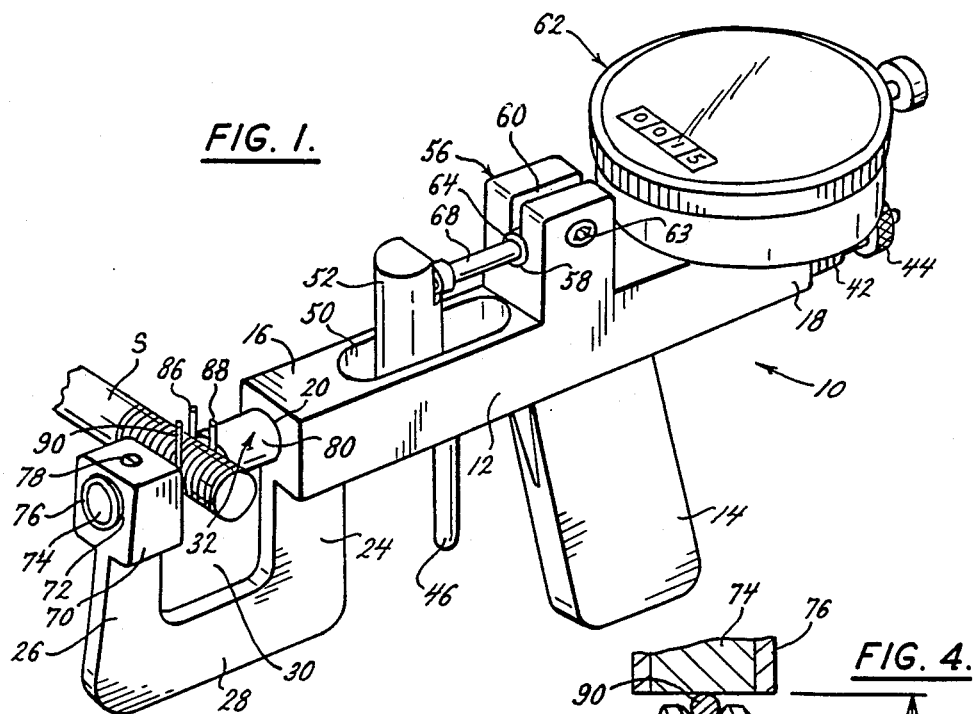
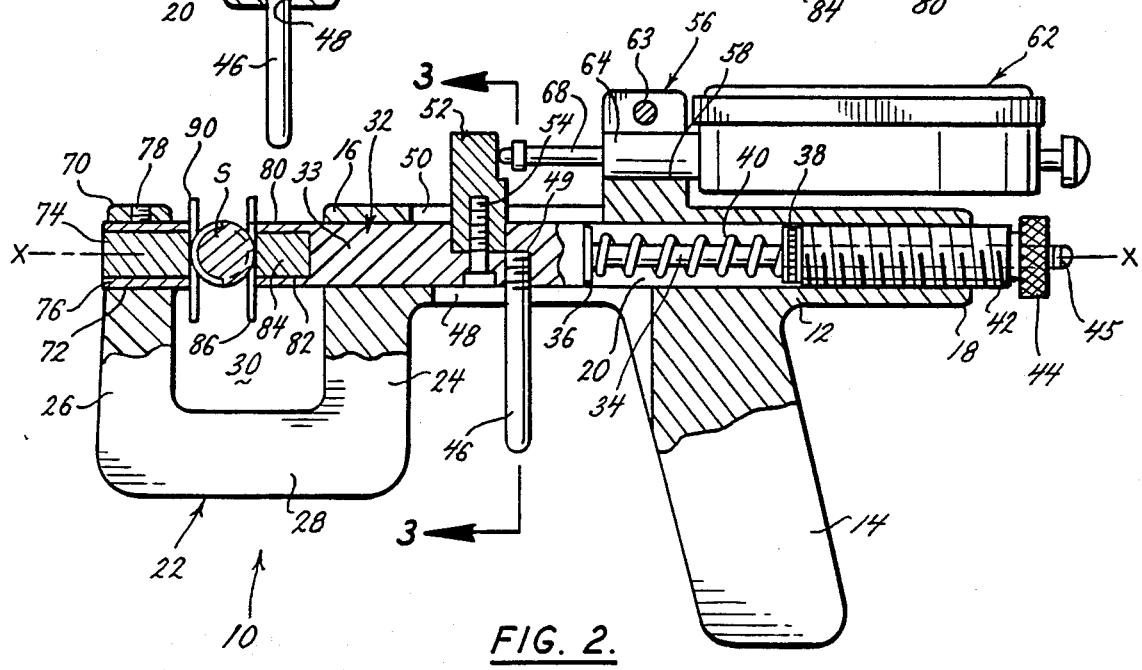

MAGNETIC WIRE HOLDING DEVICE

BACKGROUND OF THE INVENTION

1. Field of the Invention

The present invention generally relates to hand-held measuring devices and, more particularly to a new and improved measuring device adaptable for easily determining both major and pitch diameters of screw threads, gears, splines and the like.

2. Description of the Prior Art

The use of three gauging wires of known diameter to determine the pitch diameter of a screw thread, gear or spline is well known in the art. As discussed in U.S. Pat. No. 3,068,582 issued to Crossley, the method involves positioning two gauging wires side-by-side in adjacent grooves of the screw thread to be measured. The remaining gauging wire is positioned in a groove diametrically opposed from the first two wires and an "over the wire" measurement is taken by an outside micrometer. The actual pitch diameter is then easily determined by subtracting from the micrometer measurement a constant associated with the particular gauging wires employed.

It is extremely difficult to hold the three gauge wires in their proper positions against the screw thread while, at the same time, positioning the micrometer to make the over-wire measurement. Several such measurements often must be made over the length of the screw thread to determine size, taper and roundness of the pitch cylinder. In practice, gauging wires are often dropped and lost during the measuring process.

A variety of devices have been suggested for maintaining gauging wires in their proper relative positions during the screw thread measuring process. For example, the above cited Crossley U.S. Pat. No. 3,068,582 employs a separate, notched holder which, itself, can be easily misplaced when not in use. Furthermore, it would be necessary to maintain notched holders of varying sizes to accommodate screw threads of varying diameter. A further device is suggested in U.S. Pat. No. 2,663,948 issued to Scully, wherein a plurality of separate gauging wires are each mounted on a cylindrically-shaped holder. The Scully device employs a rather complicated and awkward adjustment collar and screw assembly for adjusting the relative positions of the gauging wires.

In an apparent effort to overcome the problems associated with the need for separate holders, Japanese Pat. No. 57-149902 issued to Nakarnishi suggests a process wherein a screw thread to be measured is temporarily magnetized to retain a plurality of gauging wires in place by magnetic attraction.

Because this procedure can only be effective when employed with screw threads formed of magnetizable material, Nakarnishi does not solve the problem of retaining gauging wires in their relative positions when measuring the pitch diameter of screw threads formed of such common materials as aluminum, brass, stainless steel, plastic or the like. Nakarnishi also fails to suggest any structure for calibrating and adjusting the gauging force as required to compensate for gauging wires of various size and shape.

While three gauging wires are generally considered the most acurate means of determining pitch diameter, other gauging devices such as that suggested in U.S. Pat. No. 2,440,967 issued to Moore are well known. Moore does not teach the use of three gauging wires. Rather, Moore suggests a gun-shaped device having a first gauging block holding two gauging wires and a further, curved gauging block. The blocks are biased into contact with opposite sides of the screw thread and an integrally mounted indicator is positioned for directly displaying the pitch diameter. Devices such as suggested by Moore are difficult to calibrate and can only be used where the curved surfaces of the gauging blocks precisely match the circumference of the screw thread. As it becomes necessary to measure screw threads of varying diameter, it is evident that the Moore device must repeatedly replace both gauging blocks to maintain proper engagement with the screw thread. In a similar manner, the pair of gauging wires must also be changed to assure proper fit. It is further noted that the gauging pressure generated between the blocks and the screw thread in Moore is dependent upon the continuous pressure force applied to the trigger. Because it is difficult, if not impossible, for an operator to apply constant pressure to the trigger, the gauging pressure tends to fluctuate, often leading to an improper reading by the measuring device.

As will become clear hereafter, the present invention provides a measuring device which overcomes the referred to problems confronting known prior art assemblies, while at the same time providing an effective and accurate procedure for measuring pitch diameters of screw threads, gears, splines and the like.

OBJECTS AND SUMMARY OF THE PRESENT INVENTION

An object of the present invention is to provide a hand-held measuring device for determining the pitch diameter of screw threads, gears, splines and the like, wherein gauging wires are magnetically retained in their proper positions on opposite sides of the screw thread.

A further object of the present invention is to provide a three wire measuring device adaptable for easily measuring the pitch diameter of screw threads of varying diameter.

Another object of the present invention is to provide a hand-held gauging wire measuring device for measuring the pitch diameter of screw threads formed of aluminum, brass, stainless steel, plastic and the like.

A yet further object of the present invention is to provide a measuring device wherein a predetermined gauging pressure is achieved between the screw thread, gauging wires and measuring device for proper over-the-wire measurement of the screw thread, with the gauging force being easily adjustable to match the size of the screw thread and gauging wires employed.

A preferred embodiment of the present invention achieves the aforesaid objects by providing a hand-held measuring device having a fixed anvil with a magnetic insert mounted thereon and a relatively movable spindle with a separate magnetic insert mounted thereon. The movable spindle is axially aligned with the fixed anvil and the two magnetic inserts are disposed face-to-face. By selective actuation of a trigger mechanism, the movable spindle and its associated magnetic insert can be moved away from the fixed anvil and its associated magnetic insert. The measuring device further includes an indicator calibrated to measure the distance between confronting faces of the magnetic inserts.

A further feature of the preferred embodiment resides in the ability to apply an adjustable gauging pressure to the gauging wires and screw thread through use of a helical compression spring compressed between the movable spindle and a threaded adjustment screw. The gauging pressure exerted by the movable spindle against the gauging wires can be precisely calibrated and readily adjusted to match the gauging pressure to the size of the gauging wires employed by merely rotating the adjustment screw to either compress or relax the compression spring and thereby vary the pressure against the movable spindle and hence the gauging wires.

During operation, the trigger is actuated against the compression spring to draw the movable spindle away from the anvil and thereby separate the magnetic inserts from one another. Two gauging wires are brought into close promimity with one of the magnetic inserts and a third gauging wire is brought into close proximity with the other magnetic insert. The pair of gauging wires become magnetically coupled to the one magnetic insert while the remaining gauging wire is magnetically coupled to the other magnetic insert. The three gauging wires are arranged to extend substantially parallel to one another. A screw thread having a pitch diameter to be measured is positioned between the magnetic inserts and their respective gauging wires and the trigger is released, allowing the compression spring to expand and propel the spindle and its magnetic insert toward the anvil and its magnetic insert. As the gauging wires approach one another, each wire partially fits within a groove of the screw thread positioned between the anvil and movable spindle. The magnetic inserts continue to magnetically retain the gauging wires in their proper relative positions as the movable spindle advances toward the anvil. When the gauging wires come to rest against opposite sides of the screw thread, the calibrated indicator will display the over-the-wire measurement of the screw thread from which the pitch diameter is easily determined. If properly calibrated to account for both the size of the gauging wires and the gauging pressure of the compression spring, the indicator will display the actual pitch diameter.

A more complete understanding of this invention can be obtained from the following detailed description when read in conjunction with the accompanying drawings wherein similar elements are referred to and indicated by similar referenced numerals.

BRIEF DESCRIPTION OF THE DRAWINGS

The present invention will now be described in more detail in the following portions of this specification with reference to the accompanying drawings, wherein:

FIG. 1 is a perspective view of a preferred embodiment of the present invention;

FIG. 2 is a section view taken along the lines 2—2 of FIG. 1;

FIG. 3 is a section view taken along the lines 3—3 of FIG. 2;

FIG. 4 is an enlarged sectional view of a portion of FIG. 1;

DETAILED DESCRIPTION OF THE PREFERRED EMBODIMENT

Figure 6:
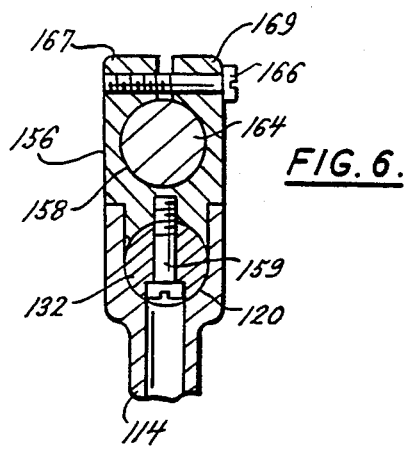
FIG. 6 is section view taken along the lines 6—6 of FIG. 5.

The preferred embodiment of the present invention is illustrated by way of example in FIGS. 1-4. With specific reference to FIGS. 1 and 2, a hand-held measuring device generally indicated at 10 includes a body 12 and a substantially rectangularly-shaped handle grip 14 extending therefrom. Handle grip 14 may be integrally formed with body 12 or attached by conventional screw fasteners or the like, not shown for purposes of simplicity.

Body 12 is preferably of elongated, substantially rectangular configuration with a front end portion 16 and an internally threaded rear-end portion 18. A substantially cylindrically-shaped passageway 20 extends completely through body 12 along its longitudinal axis X—X. Integrally attached to the front end portion 16 of body 12 is a holder assembly 22, consisting of a first leg portion 24 integrally attached to body 12, a second leg portion 26 spaced from and extending substantially parallel to leg portion 24 and a third leg portion 28 extending between and integrally joining to leg portions 24 and 26, respectively. Leg portions 24 and 26 each extend substantially perpendicular to longitudinal axis X—X, while leg portion 28 extends substantially parallel to, though displaced from longitudinal axis X—X. The leg portions 24, 26 and 28 of holder assembly 22 define a substantially U-shaped opening 30 sufficient in size to allow a screw thread S to be positioned therein.

Turning to FIG. 2, an elongated spindle 32 of cylindrical configuration is slidably disposed within passageway 20. Spindle 32 includes an enlarged forward end portion 33 of substantially cylindrical configuration having a diameter slightly less than the diameter of passageway 20. Spindle 32 further includes a coaxial, elongated rod portion 34 extending through passageway 20 and beyond the rear end 18 of body 12. Rod portion 34 has a substantially cylindrical configuration of reduced diameter as compared to the diameter of integrally attached forward end portion 33. Spindle 32 further includes a donut-shaped shoulder 36 formed between forward end portion 33 and rod portion 34. Slidably mounted on rod portion 34 is a bushing assembly 38 axially spaced from spindle shoulder 36. A helically-shaped compression spring 40 encircles rod 34 and extends into abutment with spindle shoulder 36 and bushing assembly 38, respectively. A hollow adjustment screw 42 has external threads adaptable for engaging an internally threaded portion of passageway 20 disposed within rear-end portion 18 of body 12. By selectively advancing screw 42 into the threaded portion of passageway 20, a forward end portion of screw 42 is brought into abutting contact with bushing assembly 38. A rear end portion of screw 42 projects beyond body 12 and includes a knob 44 having a knurled outer surface. By selective rotation of knob 44 in a clockwise direction, adjustment screw 42 is advanced into passageway 20, displacing bushing assembly 38 toward spindle shoulder 36, and compressing spring 40 therebetween. Indicia 45 appear on the end of rod portion 34 extending beyond screw 42 and serve to designate the degree of gauging pressure exertable by compression spring 40 against spindle shoulder 36 and consequently against any gauging wires and screw thread to be measured. The advantages of providing an easily adjustable contact pressure assembly will soon become apparent.

Referring to FIGS. 1, 2 and 3, a trigger 46 attached to spindle 32 extends through an elongated slot 48 formed in body 12 adjacent handle grip 14 and first leg portion 24. Trigger 46 is of conventional, generally cylindrical configuration and is threadedly attached to spindle 32 as shown at 49. Alternative conventional fastening means such as glue or frictional engagement may be employed for securing trigger 46 to spindle 32. Body 12 includes a further, elongated slot 50 substantially 180° from slot 48, and trigger 46. Slot 50 disposed extends parallel to slot 48 and, as shown in FIG. 3, each slots 48 and 50 join passageway 20. A cylindrically-shaped stub-shaft 52 is fixedly attached to forward end portion 33 of spindle 32 by means of a set screw 54 extending from an opening in spindle 32 into threaded engagement with an opening in stub-shaft 52. Stub-shaft 52 extends from spindle 32 through slot 50 and beyond body 12 in a direction substantially opposite from trigger 46. As will become clear hereafter, movement of trigger 46 within slot 48 causes movement of spindle 32 through passageway 20 and a corresponding movement of stub-shaft 52 within slot 50.

A bifurcated bracket assembly 56 is fixedly attached to body 12 at a position between stub-shaft 52 and rear end portion 18 which is generally opposite from handle grip 14. Bracket assembly 56 extends outwardly from body 12 in a direction substantially parallel to that of stub-shaft 52. Bracket assembly 56 includes a longitudinal passageway 58 and an elongated slot 60 extending from passageway 58 to an outer surface 60. Supported by bracket assembly 56 is a translational indicator assembly 62 having a forwardly extending support arm 64 retained within passageway 58 by means of a transverse fastening screw 63 which extends between the bifurcated portions of bracket assembly 56 formed by slot 60. By rotating fastening screw 63 in a clockwise direction, slot 60 is reduced in size, creating an interference fit between passageway 58 and support arm 64.

Translational indicator assembly 62 is of conventional construction and may include a plunger 68 supported for reciprocal movement within support arm 64. Plunger 68 is conventionally biased by a spring, not shown, into contact with stub-shaft 52. Any movement of stub-shaft 52 within its slot 50 results in a corresponding movement of plunger 68. Translational indicator assembly 62 displays a digital readout of the movement of plunger 68 in a well known manner, not shown for purposes of simplicity. Such an indicator is the commercially available SPI 30-285-1 sold by Swiss Precision Instruments, Inc. Alternatively, a sweep hand indicator of the type described in U.S. Pat. Nos. 4,335,518 issued June 22, 1982 to Reef or 2,440,967 issued May 4, 1948 to Moore could be employed. Each of these patents is incorporated herein by express reference.

Referring again to FIGS. 1 and 2, leg portion 26 includes an enlarged anvil portion 70 having a cylindrical passageway 72 extending therethrough along a continuation of longitudinal axis X—X of body 12. A first permanent magnetic insert 74 of cylindrical configuration is arranged within a sleeve 76 which is, itself, positioned within passageway 72. Magnetic insert 74 is preferably adhesively bonded to sleeve 76 by epoxy cement; however, any known fastening arrangement such as a press-fit may be employed. As shown in FIG. 2, magnetic insert 74 and its surrounding sleeve 76 project beyond passageway 72 in the direction of spindle 32. An adjustment screw 78 extends through anvil portion 70 and into frictional contact with sleeve 76, preventing undesirable movement of sleeve 76 and attached magnetic insert 74 within passageway 72. A forward end portion 80 of spindle 32 includes a cylindrically-shaped cavity 82 aligned with and directly confronting anvil portion 70. A second permanent magnetic insert 84, similar in size and shape to insert 74, is positioned within cavity 82. Magnetic insert 84 is preferably adhesively bonded into contact within cavity 82 of spindle 32 by a layer of epoxy cement or the like. Magnetic inserts 74 and 84 are axially aligned with one another and each magnetic insert is magnetically aligned to attract a magnetizable gauging wire into contact therewith. While magnetic inserts 74 and 84 are described as being of similar cylindrical shape and size, it is considered within the scope of the present invention to employ magnets which differ significantly from one another in size and/or shape. It is only necessary for each magnetic insert to be oriented so as to magnetically attract and retain gauging wires formed of magnetizable material used in determining the pitch diameter of screw threads, gears, splines and the like.

The use of three gauging wires to determine the pitch diameter is a well know procedure, clearly set forth in U.S. Pat. No. 3,068,582 issued Dec. 18, 1962 to Crossley and incorporated herein by express reference. While the gauging wires themselves make up no part of the present invention; a plurality of three separate gauging wires, 86, 88 and 90 of identical size, shape and diameter are conventionally employed in determining the pitch diameter of a screw thread S. In particular, gauging wires 86, 88 and 90 are conventionally formed of magnetizable iron-based material attractable to magnetic inserts such as 74 and 84. As shown in FIG. 4, the pitch diameter E is determinable by measuring the over-the-wire distance M and subtracting a constant specific to the material and particular diameter of gauging wires 86, 88, and 90 employed.

In order to determine the pitch diameter of screw thread S, it is merely necessary to draw trigger 46 toward hand grip 14, thereby separating spindle 32 from anvil portion 70. Two of the gauging wires 86 and 88 are brought into magnetic contact with one of the magnetic inserts, for example magnetic insert 84, and the remaining gauging wire is brought into magnetic contact with the remaining magnetic insert 74. It is noted that two of the gauging wires could just as well be brought into contact with magnetic insert 74 and one gauging wire into contact with magnetic insert 84. After the gauging wires are magnetically coupled to their respective magnetic inserts and are generally aligned with one another, screw thread S is positioned in the gap 30 formed between magnetic inserts 74 and 84 and trigger 46 is released. Compression spring 40, having been compressed by initial movement of trigger 46 and spindle 32, is now free to expand and propel spindle 32 through passageway 20 toward anvil portion 70. Movement of spindle 32 continues until it reaches the position of FIG. 4, wherein each gauging wire 86, 88 and 90 comes to rest partially within a groove of screw thread S while remaining in contact with one of the magnetic inserts 74 or 84, respectively. At this point, stub-shaft 52 will have depressed spring-biased plunger 68 a distance directly corresponding to the over-the-wire distance M. If the translation indicator assembly 62 is properly calibrated to account for the specific constant of the measuring wires employed, the pitch diameter E of screw thread S can be directly read.

Pitch diameter measurements should be taken when the measuring device 10 applies a specified gauging pressure against the screw thread as predetermined for the particular gauging wires employed. Once calibrated, any desired gauging pressure for measuring device 10 is easily achieved by merely rotating knob 44 of adjustment screw 42 until a predetermined indicia 45 on rod portion 34 is aligned with the end surface of screw 42.

Figure 5:
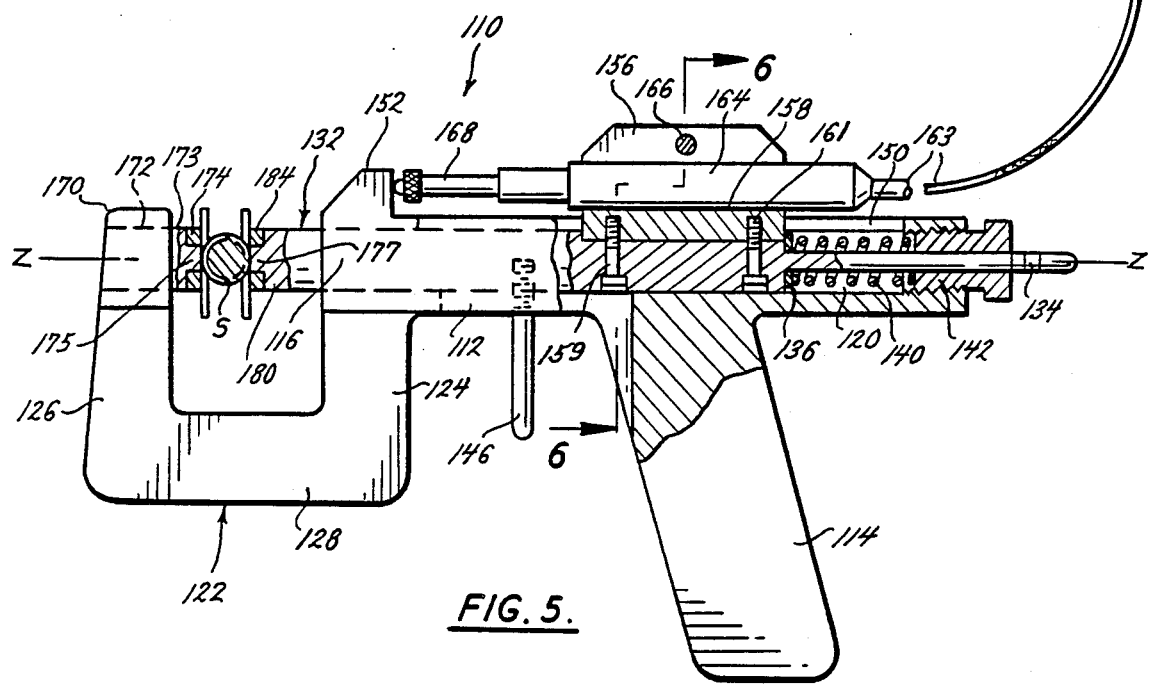
FIG. 5 is a cross-sectional side view of an alternative embodiment of the present invention.

A further embodiment of the present invention is shown in FIGS. 5 and 6, wherein similar numerals are used to describe similar items previously described with the addition of the prefix one (1). A measuring device is generally indicated at 110 and includes a body 112 and a hand-held grip 114 extending therefrom. A spindle 132 of variable cross-section is mounted for sliding movement within an enlarged passageway 120 formed in body 112.

As shown in FIG. 5, a bifurcated bracket assembly 156 having spaced end portions 167 and 169 is mounted for joint movement with spindle 132 by means of attachment screws 159 and 161, respectively. A slot 150 extends between passageway 120 and the outer surface of body 112, with bracket assembly 156 extending through and beyond slot 150. Body 112 further includes an enlarged front end portion 116 having an integral stub-shaft 152 extending outwardly in a direction opposite from that of handle grip 114. A conventional translational indicator assembly 162 is remotely positioned from measuring device 110. Translational indicator 162 is of conventional design and, in itself, makes up no part of the present invention. A suitable digital indicator adaptable for displaying a precise over-the-wire reading is the Sylvac #54-618-100 indicator commercially sold by the Fowler Company. An electrical transmission cord 163 extends from indicator 162 to a support arm 164 mounted in a passageway 158 extending through bracket assembly 156.

A spring-biased plunger 168 is mounted within support arm 164 for reciprocal movement toward and away from stub-shaft 152. The end of plunger 168 is brought into contact with stub-shaft 152 during calibration of measuring device 110. A fastening screw 166 extends between end portions 167 and 169 of bifurcated bracket assembly 156. Selective rotation of screw 166 causes end portions 167 and 169 to move toward one another, creating an interference fit between support arm 164 and surrounding passageway 158.

A helically-shaped compression spring 140 is located within passageway 120 and surrounds an elongated rod portion 134 of spindle 132. A shoulder 136 is formed at a forward end of rod portion 134. An opposite end of rod portion 134 extends through and beyond body 112 and a hollow adjustment screw 142 threadedly connected to an interior rear wall portion of passageway 120.

A substantially U-shaped holder 122 is integrally attached to body 112 as shown in FIG. 5. Holder 122 includes integrally attached leg portions 124, 126 and 128, with leg portion 126 extending substantially parallel to leg portion 124. An end of leg portion 126 forms an anvil portion 170 having a passageway 172 extending therethrough. A cylindrical insert 173 is positioned within passageway 172, with insert 173 having a cylindrical knob 175 extending outwardly toward spindle 132. In a like manner, the forward end 180 of spindle 132 includes a cylindrical knob 177 extending toward knob 175. The knobs 175 and 177 are preferably of similar size and are each concentrically aligned with a longitudinal axis Z—Z extending through body 112. A donut-shaped permanent magnetic insert 174 surrounds knob 175, while a separate, donut-shaped permanent insert 184 surrounds knob 177. Each magnetic insert is adhesively attached to its respective knob. However, it is considered within the scope of the present invention to provide any well known attachment such as an interference fit between the magnets and their respective knobs. The magnetic inserts 174 and 184 are magnetically oriented to attract gauging wires formed of magnetizable material.

During operation, a trigger 146 is attached to spindle 132 is released, allowing compression spring 140 to expand and displace both spindle 132 through passageway 120 and attached bracket assembly 156 through slot 150 relative to fixed stub-shaft 152. This also results in the movement of spring-biased plunger 168 toward stub-shaft 152. By proper calibration of translational indicator assembly 162, it is possible to directly read the pitch diameter of a screw thread S positioned between spindle 132 and anvil portion 170 by means of three gauging wires magnetically attached to inserts 174 and 184 as previously explained.

Figure 8:
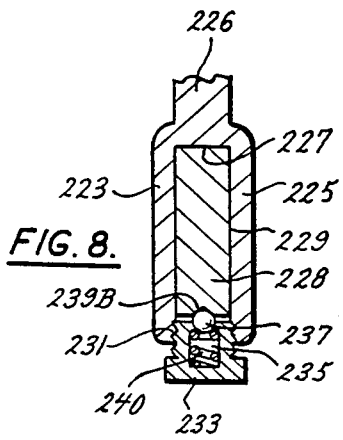
FIG. 8 is a section view taken along the lines 8—8 of FIG. 7.
Figure 7:
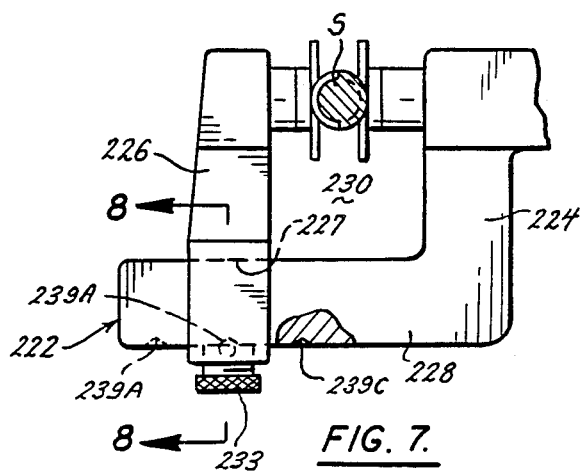
FIG. 7 is a partial side view of a yet further embodiment of the present invention.

In a further alternative embodiment of the present invention, the integrally formed holder assemblies 22 and 122 are replaced by an adjustable holder assembly as best shown in FIGS. 7 and 8. In particular, a substantially U-shaped holder assembly 222 includes a first leg portion 224 integrally attached to a body of a measuring device such as shown in FIGS. 2 and 5. A further leg portion 228 integrally joins leg portion 224 and extends substantially perpendicular thereto. A separate, bifurcated leg portion 226 includes end portions 223 and 225 with a slot 227 extending therebetween. Slot 227 includes a substantially rectangularly-shaped portion 229 adaptable for enclosing third leg 228 on all four sides. Slot 227 further includes a partially cylindrical-shaped portion 231 threaded to receive a threaded adjustment screw 233 having a recess 235 formed therein. A sphere 237 partially rests within recess 235 and partially projects therebeyond. Adjustment screw 233 includes an elongated portion retaining a compression spring 240 which serves to bias sphere 237 away from recess 235. Leg 228 includes a number of axially aligned cone-shaped depressions 239A, B and C adaptable for selective alignment with screw 233 and sphere 237. By sliding leg 228 within slot 227 it becomes possible to align a particular depression 239A, B or C with adjustment screw 233 and sphere 237. When properly aligned, adjustment screw 233 is rotated to further compress spring 240, thereby wedging sphere 237 into contact with the aligned depression, preventing further movement of leg portion 226. It can be seen that the holder assembly of FIG. 7 allows a user to adjust the size gap of the gap 230 formed between leg portions 224 and 226, thereby allowing for measurement of screw threads, gears and splines of significantly different diameters.

While the present invention has been disclosed in connection with the preferred embodiment thereof, it should be understood that there may be other embodiments which fall within the spirit and scope of the invention as defined by the following claims.

I claim:

1. An improved, hand-held measuring device for determining both the major and pitch diameters of screw threads, gears, splines and the like, and comprising:

an elongated body having a passageway extending along a longitudinal axis thereof;

said passageway having a front-end portion and a rear-end portion aligned with one another and with said longitudinal axis of said elongated body;

a spindle slidably disposed within said passageway, with said spindle having a forward end portion extending through and beyond the forward-end portion of said passageway;

a hollow adjustment screw encircling said spindle and threadedly attached to a portion of said elongated body forming said rear-end portion of said passageway;

a support assembly comprising a plurality of attached leg portions including a first leg portion attached to said elongated body and a second leg portion having a surface intersecting the longitudinal axis of said body and confronting said forward end of said spindle, forming an opening of sufficient size to position a screw thread therebetween;

adjustable biasing means disposed within said passageway between said hollow adjustment screw and said forward end portion of said spindle for biasing said spindle through said passageway toward said second leg portion of said support assembly;

at least one of said confronting surfaces of said second leg portion and said forward end of said spindle including attractable magnetic means having a magnetically attractable end surface facing said opening for attracting and magnetically retaining gauging wires as required for determining the pitch diameter of a screw thread positioned in the opening formed by said confronting surfaces.

2. An improved measuring device according to claim 1, wherein a handle grip is integrally attached to said body and extends in transverse direction to said longitudinal axis, forming a gun-shaped measuring device.

3. An improved measuring device according to claim 1, wherein said spindle further comprises a rear-end portion having a cross-section of reduced size as compared to said forward end portion, with said rear-end portion of said spindle extending beyond a rear-end portion of said passageway.

4. An improved measuring device according to claim 1, wherein said adjustable means comprises a helical spring assembly encircling said spindle and compressed between said adjustment screw and said forward end portion of said spindle.

5. An improved measuring device according to claim 1, wherein said body further includes a bottom slot extending from said passageway to a bottom surface of said body, with a substantially cylindrically-shaped trigger extending from said spindle through said bottom slot, wherein selective movement of said trigger in a direction generally parallel to said longitudinal axis of said body serves to retract said spindle through said passageway away from said second leg portion of said support assembly.

6. An improved measuring device according to claim 3, wherein said spindle is of substantially cylindrical configuration.

7. An improved measuring device according to claim 5, wherein said body further includes a top slot extending from said passageway to a top surface of said body, wherein a stub-shaft is attached to said spindle and extends through said top slot for joint movement with said spindle.

8. An improved measuring device according to claim 7, wherein said body further includes a bracket assembly having a passageway with a longitudinal axis intersecting said sub-shaft, said passageway being of sufficient size to slidably support a translational indicator plunger arm extending from said bracket into contact with said stub-shaft, whereby selective movement of said spindle results in a corresponding movement of said stub-shaft and said plunger arm.

9. An improved measuring device according to claim 1, wherein said attractable magnetic means comprises a single magnetic member.

10. An improved measuring device according to claim 9, wherein said magnetic member has a substantially cylindrical configuration and said forward end portion of said spindle includes a cavity of sufficient size to receive said substantially cylindrical magnetic member, whereby an attractable end surface of said magnetic member is disposed substantially flush with a forward end surface of said spindle.

11. An improved measuring device according to claim 9, wherein said magnetic member has a substantially ring-shaped configuration with an opening extending completely therethrough and said forward end portion of said spindle includes a substantially cylindrically-shaped knob, having a diameter sufficient to allow said knob to project through said opening in said ring-shaped magnetic member.

12. An improved measuring device according to claim 9, wherein said magnetic member has a substantially cylindrical configuration and said second leg portion has a passageway of sufficient size to receive said magnetic member, whereby an attractable end surface of said magnetic member is disposed substantially flush with an end surface of said second leg portion.

13. An improved measuring device according to claim 9, wherein said magnetic member has a substantially ring-shaped configuration with an opening extending completely therethrough and said second leg portion includes a substantially cylindrically-shaped knob projecting toward said spindle, having a diameter sufficient to allow said knob to project through said opening in said ring-shaped magnetic member.

14. An improved measuring device according to claim 1, wherein said attractable magnetic means comprises two cylindrically-shaped, attractable magnetic inserts, with said forward end of said spindle including a substantially cylindrical-shaped cavity of sufficient diameter of receive one of said attractable magnetic inserts and said second leg portion including a passageway having a sufficient diameter to receive the remaining attractable magnetic insert, whereby said attractable magnetic inserts confront one another at a distance chosen by selective movement of said spindle.

15. An improved measuring device according to claim 1, wherein said attractable magnetic means comprises two ring-shaped, attractable magnetic members, wherein said forward-end of said spindle and said second leg portion each includes a cylindrical knob of sufficient diameter to project through one of the magnetic members, whereby said magnetic members confront one another at distance chosen by selective movement of said spindle.

16. An improved measuring device according to claim 1, wherein said support assembly further includes a third leg portion integrally attached at opposite ends to said first and second leg portions, wherein said first and second leg portions extend substantially parallel to one another and combine with said third leg portion to form a substantially U-shaped support assembly.

17. An improved measuring device according to claim 1, wherein said support assembly further includes a third leg portion integrally attached to said first leg portion and adaptable for extending into a slot formed in said second leg portion, whereby said second leg portion extends parallel to said first leg portion and is selectively movable along said third leg portion toward or away from said first leg portion.

18. An improved measuring device for determining the diameter of screw threads, gears, splines and the like, and comprising:
- an elongated body having a passageway extending along a longitudinal axis thereof:
- a substantially rectangularly-shaped handle grip extending from said body in a transverse direction to said longitudinal axis;
- a spindle slidably disposed within said passageway and having a forward end portion extending beyond a forward end portion of said passageway;
- a substantially U-shaped support assembly attached to said body and having a fixed end portion spaced from and confronting the forward end portion of said spindle;
- a hollow adjustment screw encircling said spindle and threadedly supported in a rear-end portion of said passageway;
- biasing means disposed within said passageway between said hollow adjustment screw and said forward end portion of said spindle for biasing said spindle into contact with said fixed end portion of said support assembly;
- trigger means for retracting said spindle through said passageway against said biasing means, thereby allowing a screw thread, gear or spline to be placed between confronting surfaces of said spindle and fixed end portion of said support assembly; and
- an attractable magnetic member mounted on the forward end portion of said spindle and a separate attractable magnetic member mounted on the confronting end portion of said U-shaped support member each engaging and magnetically retaining gauging wires in contact with a screw thread, gear and the like positioned therebetween.

19. An improved measuring device according to claim 18, wherein said biasing means comprises a helical spring encircling the rear end portion of said spindle.

20. An improved measuring device according to claim 18, wherein said trigger means comprises a substantially cylindrically-shaped trigger attached to said spindle and extending in a direction substantially parallel to said handle grip through an elongated slot extending through said body from said passageway to another surface of said body.

* * * * *